C. T. McCREADY.
VINE CUTTER.
APPLICATION FILED JAN. 26, 1917.
1,252,914. Patented Jan. 8, 1918.
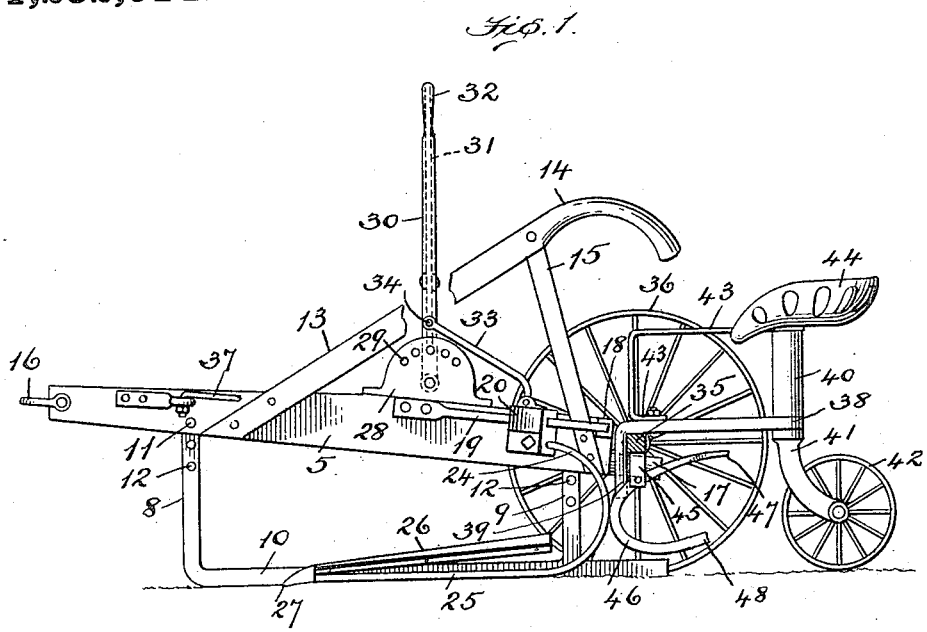
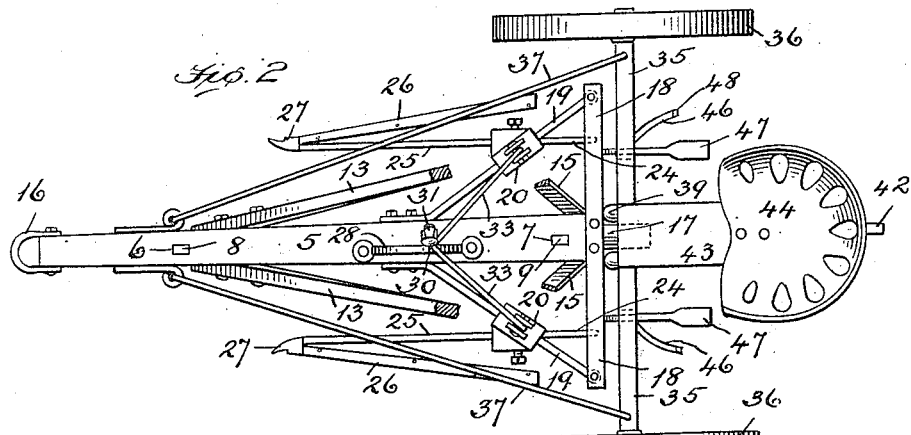
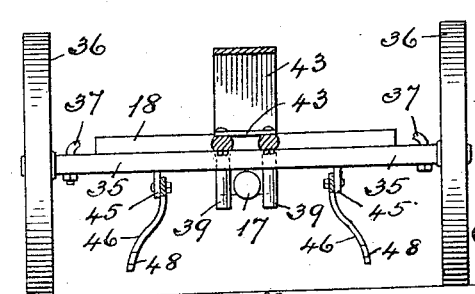
Inventor
Charles T. McCready
By
Munn & Co.
Attorneys

UNITED STATES PATENT OFFICE.

CHARLES T. McCREADY, OF ONLEY, VIRGINIA.

VINE-CUTTER.

1,252,914.  Specification of Letters Patent.  Patented Jan. 8, 1918.

Application filed January 26, 1917. Serial No. 144,658.

*To all whom it may concern:*

Be it known that I, CHARLES T. Mc-CREADY, a citizen of the United States, residing at Onley, in the county of Accomac and State of Virginia, have invented certain new and useful Improvements in Vine-Cutters, of which the following is a specification.

This invention relates to improvements in vine-cutters and has particular reference to that class of vine-cutters which are drawn by horses and utilized in cutting such vines as grow or extend along the ground, such for example as potato vines.

One object of the invention is to provide improved means for sustaining the cutters so they may be readily moved with respect to the beam from which they are indirectly sustained and thereby quickly adjust the cutters to suit the width of the rows with which the cutter is to operate.

Another object is to provide improved means for simultaneously adjusting the cutters at opposite sides of and with respect to the beam.

A further object is to provide in a vine cutter, improved means for pressing the vines down against the soil to facilitate the cutting operation and to prevent clogging or wedging of the cut vines at the rear end of the cutting blades, and A still further object of the invention is to provide improved means for sustaining the operator of the machine in such position as will permit ready access to the pressing means and also to the adjusting means.

With these, and other objects in view, the invention is illustrated in the accompanying drawing, wherein,—

Figure 1, shows the improved machine in side elevation.

Fig. 2, illustrates the same in top plan.

Fig. 3, shows a vertical sectional elevation through the machine,—the section being taken immediately at the rear of the axle, and Fig. 4, illustrates in perspective one of the slide blocks which carry the cutters.

Referring to the drawings by numerals, 5, designates a beam, having slots 6 and 7, extending vertically therethrough so that vertical portions 8 and 9, of a runner 10, may project into said slots and be held therein by cross-pins 11, whereby to sustain the beam in an elevated position above the ground, on which the runner travels. Perforations 12, in the vertical portions of the runner enable the beam to be vertically adjusted thereon and its position with respect to the ground varied.

Inclined bars 13, have their lower ends attached to opposite sides of the beam and their handle-ends 14, project rearwardly and are supported in an elevated position by means of brace bars 15.

The front end of the beam is provided with a clevis 16, to which the harness draft devices may be attached, and at the rear end, said beam is provided with a pin or projection 17, for a purpose presently to be explained.

At the inner end, the beam is provided with a cross-bar 18, and slide bars 19, extend from the outer ends of said bar 18, to and are rigidly secured to the beam 5. By referring to Fig. 2, of the drawing it will be seen that the slide bars thus extend at an oblique angle with respect to the beam.

Each slide bar carries a head 20, having a passage 21, as seen in Fig. 4, through which the slide bar extends, so that said head may be moved longitudinally on said slide bar between the beam and the outer end of the cross-bar. By referring to Fig. 4, it will be seen that each head 20, also has a passage or socket 22, which extends in a direction at an oblique angle with respect to the passage 21, also in said head, and that a threaded opening 23, extends from the side of the head and opens into said passage or socket 22, for a purpose that will presently be explained.

A curved arm 24, has an upper end which enters the passage or socket 22, and from the head said arm curves downwardly and has a forwardly-extending portion 25, close to the ground. Each curved arm carries a cutter blade 26, which extends rearwardly and in an outwardly-inclined direction from the point end 27, of said arm, so that when the implement is drawn forward these cutters will effect a cutting of the vines as will presently more fully appear.

It is to be understood that the implement has two oblique slide bars,—one at each side of the beam 5; that each slide bar carries a slidable head and that each head carries an arm which sustains a cutter blade.

One of the objects of this invention is to provide improved means for readily adjusting the positions of the cutter blades with respect to the beam so as to move the cutters into a position nearer to or farther from the beam and thereby enable the implement to be quickly adjusted to suit the distance between the hills of the various rows. By means of my invention I am able to effect this adjustment without the manipulation of bolts and I effect the adjustment of both cutter blades simultaneously by means which will now be explained.

On top of the beam 5, I mount a plate 28, in which there are a series of holes 29, arranged in an arc of a circle. To one side of this plate I pivotally connect the lower end of an operating lever 30. This lever has a pawl device 31, of well-known form extending down one side thereof from the handle-end 32, so that a pin on the lower end of said pawl may be made to engage one or another of said holes 29, and thereby hold the lever in any one of the several positions determined by said pin holes. Link bars 33, have one end pivotally connected to the operating lever at 34, and one of these link bars extends outwardly and rearwardly and has its outer rear end pivotally connected to one of the slidable heads 20, while the other link bar is similarly connected to the other head. It will thus be understood that when the lever 30, is swung forward, the link bars 33, and slidable heads 20, will both be drawn forward on the slide bars 19, and this forward movement of the heads will carry the curved arms 24, and their cutter blades inwardly or toward each other. Obviously, a movement of the lever 30, toward the rear will reverse the above condition of the links, heads and cutter blades and move the latter away from each other. Thus by operating bar 30, the blades may be simultaneously moved toward or from each other and thereby adjusted to suit the particular width of rows where the cutting of the vines is to take place.

At the rear end of the beam 5, I provide a cross-wise extending axle 35, which extends at right angles to and over the pin or projection 17. This axle is provided at each end with a wheel 36, and is connected to the beam 5, by means of tie rods 37, which may readily be detached when the operator desires to walk and guide the implement by the bars 13—14.

A seat support is also provided for the implement and has a horizontal plate 38, provided at its front with spaced apart and downwardly-projecting prongs 39, which extend downwardly in front of the axle 35, and at opposite sides of the rear pin or projection 17, on the end of the beam 5. This plate 38, also has a tubular sleeve 40, extending vertically from its rear end in which a caster frame 41, is loosely mounted so that a caster wheel 42, may trail on the ground at the rear of the implement. Another plate or frame 43, extends upwardly and rearwardly from the front end of plate 38, and engages the upper end of the sleeve 40, and a seat 44, is supported on said plate or frame 43, and at the rear of the handles 14.

The under side of the axle 35, carries two spaced apart brackets 45, which are located substantially at the rear of the arms 24. Each bracket pivotally sustains a curved presser arm 46, whose upper end is flattened to form a treadle or foot plate 47. The operator, by pressing downwardly on the foot plate may swing the lower end 48, of the presser arms downwardly and forwardly and press down on the vines as they pass from the cutter blades.

It will thus be understood that the operator while riding on the seat 44, may swing the lever 30, and thereby move the heads 20, on the slide bars 19, so as to move both cutters toward or from the beam and thereby quickly and simultaneously adjust the positions of said cutters to suit the width of the row he is about to pass through.

Having described my invention what I claim and desire to secure by United States Letters Patent is,—

1. In a vine cutter the combination with a beam, of means for sustaining the beam in an elevated position; slide bars extending away from the beam; cutter blades at opposite sides of the beam and means on the slide bars for adjustably sustaining the blades.

2. In a vine cutter the combination with a beam, of a runner for sustaining the beam; slide means extending in a diverging direction with respect to the beam and from opposite sides of the latter and cutter blades at opposite sides of the runner and carried by the slide means.

3. In a vine cutter the combination with a beam, of a runner for sustaining the beam; slide bars diverging from the beam; a head movable on each slide bar; arms carried by said heads and each arm having a cutter blade and lever means connected to each head for moving the latter on its slide bar.

4. In a vine cutter the combination with a beam, of a runner for sustaining the beam; a bar extending crosswise of the beam; a slide bar at each side of the beam said slide bars having one end secured to the beam and their other ends extending outwardly from the beam and attached to the bar; a head slidably carried on each bar; a lever; means connecting the lever with both heads; an arm extending from each head down toward the ground and a cutter blade carried by each arm.

In testimony whereof I affix my signature in the presence of two witnesses.

CHARLIE T. McCREADY.

Witnesses:
  GEORGE THOMAS GRINNALDS,
  GEORGE G. KELLY.

Copies of this patent may be obtained for five cents each, by addressing the "Commissioner of Patents, Washington, D. C."